(12) United States Patent
Satoh et al.

(10) Patent No.: US 9,328,940 B2
(45) Date of Patent: May 3, 2016

(54) VEHICLE SAFETY DEVICE

(71) Applicant: CALSONIC KANSEI CORPORATION, Saitama-shi, Saitama (JP)

(72) Inventors: Takeshi Satoh, Saitama (JP); Takeshi Ogasawara, Saitama (JP); Naohisa Kamiyama, Saitama (JP); Hiroki Yoshioka, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 14/699,404

(22) Filed: Apr. 29, 2015

(65) Prior Publication Data

US 2015/0247650 A1  Sep. 3, 2015

Related U.S. Application Data

(63) Continuation of application No. 13/860,144, filed on Apr. 10, 2013, now Pat. No. 9,036,316.

(30) Foreign Application Priority Data

Apr. 26, 2012 (JP) ................... 2012-100929
Dec. 25, 2012 (JP) ................... 2012-281693

(51) Int. Cl.
*F24H 1/00* (2006.01)
*B60H 1/00* (2006.01)
(Continued)

(52) U.S. Cl.
CPC .......... *F24H 1/0018* (2013.01); *B60H 1/00807* (2013.01); *B60H 1/00978* (2013.01);
(Continued)

(58) Field of Classification Search
CPC ..... F24H 1/0018; F24H 1/009; F24H 9/0005; B60H 1/00978
USPC ........................................... 361/105
See application file for complete search history.

(56) References Cited

U.S. PATENT DOCUMENTS 4,956,544 A * 9/1990 Sayward, Jr. .......... F22B 1/284
 219/437
5,682,580 A  10/1997 Iwama et al.
(Continued)

FOREIGN PATENT DOCUMENTS

DE  102010060446 A1 * 5/2011 ........... B60H 1/2221
JP  03-011331 U  2/1991
(Continued)

OTHER PUBLICATIONS

US Notice of Allowance dated Jan. 7, 2015 issued in U.S. Appl. No. 13/860,144.
(Continued)

*Primary Examiner* — Scott Bauer
(74) *Attorney, Agent, or Firm* — Foley & Lardner LLP

(57) ABSTRACT

A vehicle safety device installed in a hybrid electric vehicle or an electric vehicle is provided to be capable of interrupting a current supplied from a power supply to a load via a supply line. The vehicle safety device includes first interrupting mechanism adapted to set the supply line in an interrupted condition when a temperature of the load reaches a first set temperature and second interrupting mechanism adapted to set the supply line in the interrupted condition such that the supply line cannot be returned to an energized condition when the temperature of the load reaches a second set temperature that is higher than the first set temperature.

6 Claims, 8 Drawing Sheets

(51) Int. Cl.
*F24H 9/00* (2006.01)
*H02H 5/04* (2006.01)
*B60H 1/22* (2006.01)
*H01H 37/54* (2006.01)

(52) U.S. Cl.
CPC ............ *B60H1/2218* (2013.01); *B60H 1/2221* (2013.01); *F24H 9/0005* (2013.01); *H02H 5/047* (2013.01); *H01H 37/5427* (2013.01); *Y10S 903/903* (2013.01); *Y10T 137/6606* (2015.04)

(56) References Cited

U.S. PATENT DOCUMENTS

| | | | |
|---|---|---|---|
| 5,788,148 | A | 8/1998 | Burner et al. |
| 6,205,010 | B1 | 3/2001 | Ohsaka et al. |
| 6,300,750 | B1 | 10/2001 | Oglesbee et al. |
| 8,384,334 | B2 | 2/2013 | Takeda |
| 2007/0137599 | A1 | 6/2007 | Preiholt |
| 2011/0164340 | A1 | 7/2011 | Takeda |
| 2012/0038472 | A1 | 2/2012 | Horie |
| 2012/0043942 | A1 | 2/2012 | Tamane et al. |
| 2012/0315024 | A1* | 12/2012 | Obst ................. B60H 1/2221 392/465 |

FOREIGN PATENT DOCUMENTS

| | | |
|---|---|---|
| JP | 08-137331 A | 5/1996 |
| JP | 9-323532 A | 12/1997 |
| JP | 10-145205 A | 5/1998 |
| JP | 10-157446 A | 6/1998 |
| JP | 10-287123 A | 10/1998 |
| JP | 11-078494 A | 3/1999 |
| JP | 2002-258990 A | 9/2002 |
| JP | 2006-160112 A | 6/2006 |
| JP | 2010-254052 A | 11/2010 |
| WO | WO-2010/038339 A1 | 4/2010 |

OTHER PUBLICATIONS

US Office Action dated Sep. 5, 2014 issued in U.S. Appl. No. 13/860,144.

* cited by examiner

VEHICLE SAFETY DEVICE

CROSS REFERENCE TO RELATED APPLICATIONS

The present application is a Continuation of U.S. Ser. No. 13/860,144, filed Apr. 10, 2013, the entire disclosure of which is incorporated herein by reference.

FIELD OF THE INVENTION

This invention relates to a vehicle safety device that interrupts a current when an abnormality occurs.

BACKGROUND OF THE INVENTION

JP10-145205A discloses a switch circuit that interrupts a current supplied to a load when a temperature detected by temperature detecting means reaches or exceeds a predetermined temperature. In this switch circuit, control means open a switch on the basis of a signal from the temperature detecting means, thereby interrupting input of a control signal into a MOSFET (Metal-Oxide-Semiconductor Field-Effect Transistor), and as a result, the current supplied to the load is interrupted.

SUMMARY OF THE INVENTION

In the switch circuit of JP10-145205A, however, the current supplied to the load is interrupted by having the control means open the switch on the basis of the signal from the temperature detecting means, and therefore, when an abnormality of some kind occurs in the control means after the current has been interrupted, supply of the current to the load may be resumed.

This invention has been designed in consideration of the problem described above, and an object thereof is to improve the reliability of current interruption when an abnormality occurs in a load.

According to embodiments of this invention, a vehicle safety device installed in a hybrid electric vehicle or an electric vehicle is provided to be capable of interrupting a current supplied from a power supply to a load via a supply line. The vehicle safety device includes first interrupting mechanism that sets the supply line in an interrupted condition when a temperature of the load reaches a first set temperature and second interrupting mechanism that sets the supply line in the interrupted condition such that the supply line cannot be returned to an energized condition when the temperature of the load reaches a second set temperature that is higher than the first set temperature.

Embodiments and advantages of this invention will be described in detail below with reference to the attached figures.

EMBODIMENTS OF THE INVENTION

Referring to FIGS. 1 to 6, a vehicle safety device 100 according to a first embodiment of this invention will be described below.

Figure 1:
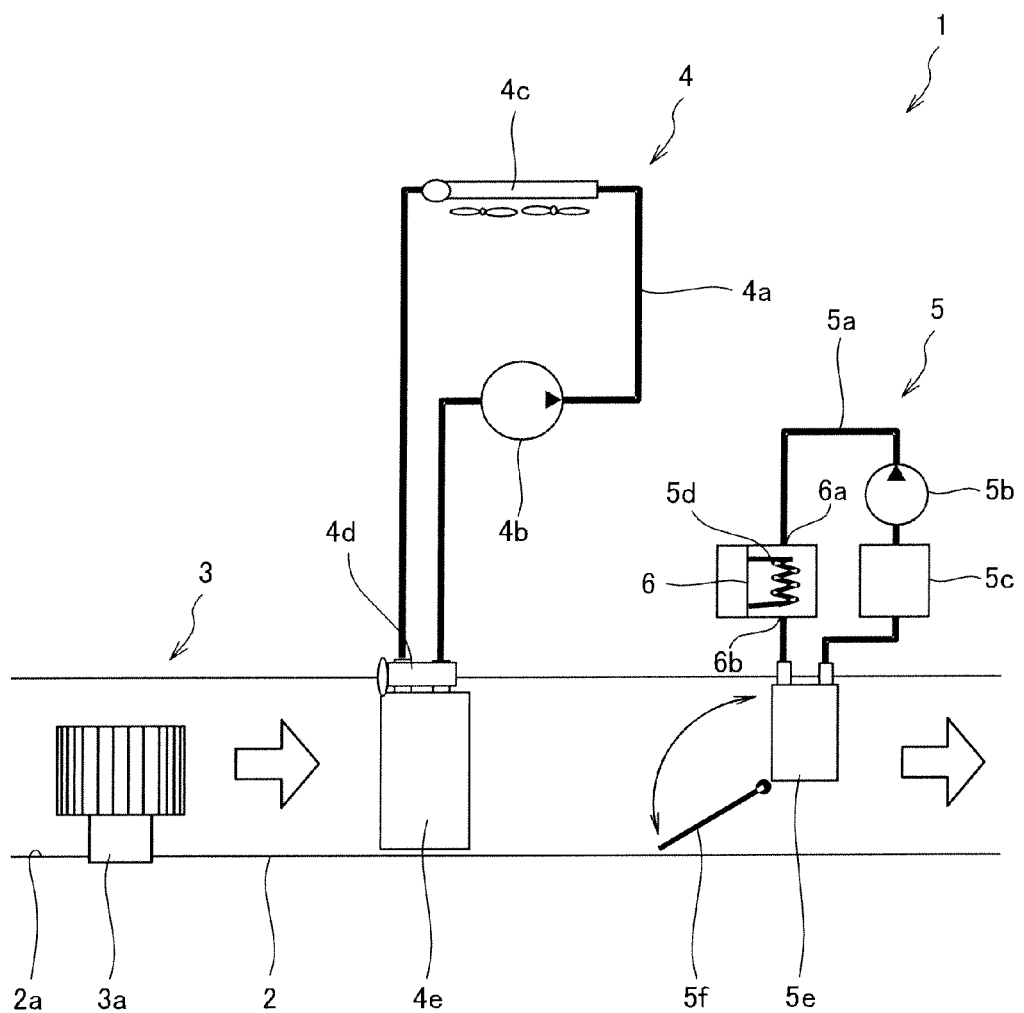
FIG. 1 is a view showing a configuration of a vehicle air-conditioning device to which a vehicle safety device according to an embodiment of this invention is applied.

First, referring to FIG. 1, a vehicle air-conditioning device 1 to which the vehicle safety device 100 is applied will be described.

The vehicle air-conditioning device 1 is an air-conditioning device installed in a hybrid electric vehicle (HEV) or an electric vehicle (EV). The vehicle air-conditioning device 1 includes an air passage 2 having an air introduction port 2a, a blower unit 3 that introduces air into the air passage 2 through the air introduction port 2a, a cooler unit 4 that cools and dehumidifies the air flowing through the air passage 2, and a heater unit 5 that warms the air flowing through the air passage 2.

Air suctioned through the air introduction port 2a flows through the air passage 2. Outside air from the exterior of a vehicle cabin and inside air from the interior of the vehicle cabin is suctioned into the air passage 2. The air passing through the air passage 2 is led into the vehicle cabin.

The blower unit 3 includes a blower 3a serving as an air blowing device that blows air into the air passage 2 by rotating about an axial center. The blower unit 3 includes an intake door (not shown) for opening and closing an outside air intake port through which outside air from the exterior of the vehicle cabin is taken in and an inside air intake port through which inside air from the interior of the vehicle cabin is taken in. By opening and closing the outside air intake port and the inside air intake port or adjusting respective openings thereof, the blower unit 3 can adjust suctioned amounts of outside air from the exterior of the vehicle cabin and inside air from the interior of the vehicle cabin.

The cooler unit 4 includes a refrigerant circulating circuit 4a through which a cooling refrigerant circulates, an electric compressor 4b that is driven by an electric motor (not shown) to compress the refrigerant, a condenser 4c that condenses the refrigerant compressed by the electric compressor 4b by discharging heat from the refrigerant to the outside, a pressure reducing valve 4d that expands the condensed refrigerant in order to reduce a temperature thereof, and an evaporator 4e that cools the air flowing through the air passage 2 using the refrigerant that has been expanded so as to decrease in temperature.

The heater unit 5 includes a refrigerant circulating circuit 5a through which a refrigerant circulates, an electric pump 5b that is driven by an electric motor (not shown) to circulate the refrigerant, an air extraction tank 5c that removes air from the circulating refrigerant, an electric heater 5d that warms the circulating refrigerant, a warm water tank 6 through which the refrigerant warmed by the electric heater 5d flows, a heater core 5e that warms the air flowing through the air passage 2 using the refrigerant warmed by the electric heater 5d, and a mix door 5f that adjusts flow rates of air led to the heater core 5e and air bypassing the heater core 5e, from among the air flowing through the air passage 2.

In the vehicle air-conditioning device 1, the air introduced into the air passage 2 through the air introduction port 2a is first led into the cooler unit 4 by the blower 3a. In the cooler unit 4, the air flowing through the air passage 2 is cooled and dehumidified through heat exchange with the evaporator 4e.

The air that passes through the evaporator 4e is divided by the mix door 5f into the air that is led to the heater core 5e and the air that bypasses the heater core 5e. The air led to the heater core 5e is warmed through heat exchange with the heater core 5e. The air warmed by the heater core 5e and the air bypassing the heater core 5e then re-converge so as to be led into the vehicle cabin. Thus, the vehicle air-conditioning device 1 adjusts the temperature and humidity of the air introduced into the air passage 2 through the air introduction port 2a, and then leads the air into the vehicle cabin.

Next, referring to FIGS. 2 and 3, the vehicle safety device 100 and an electric circuit 10 to which the vehicle safety device 100 is applied will be described.

Figure 2:
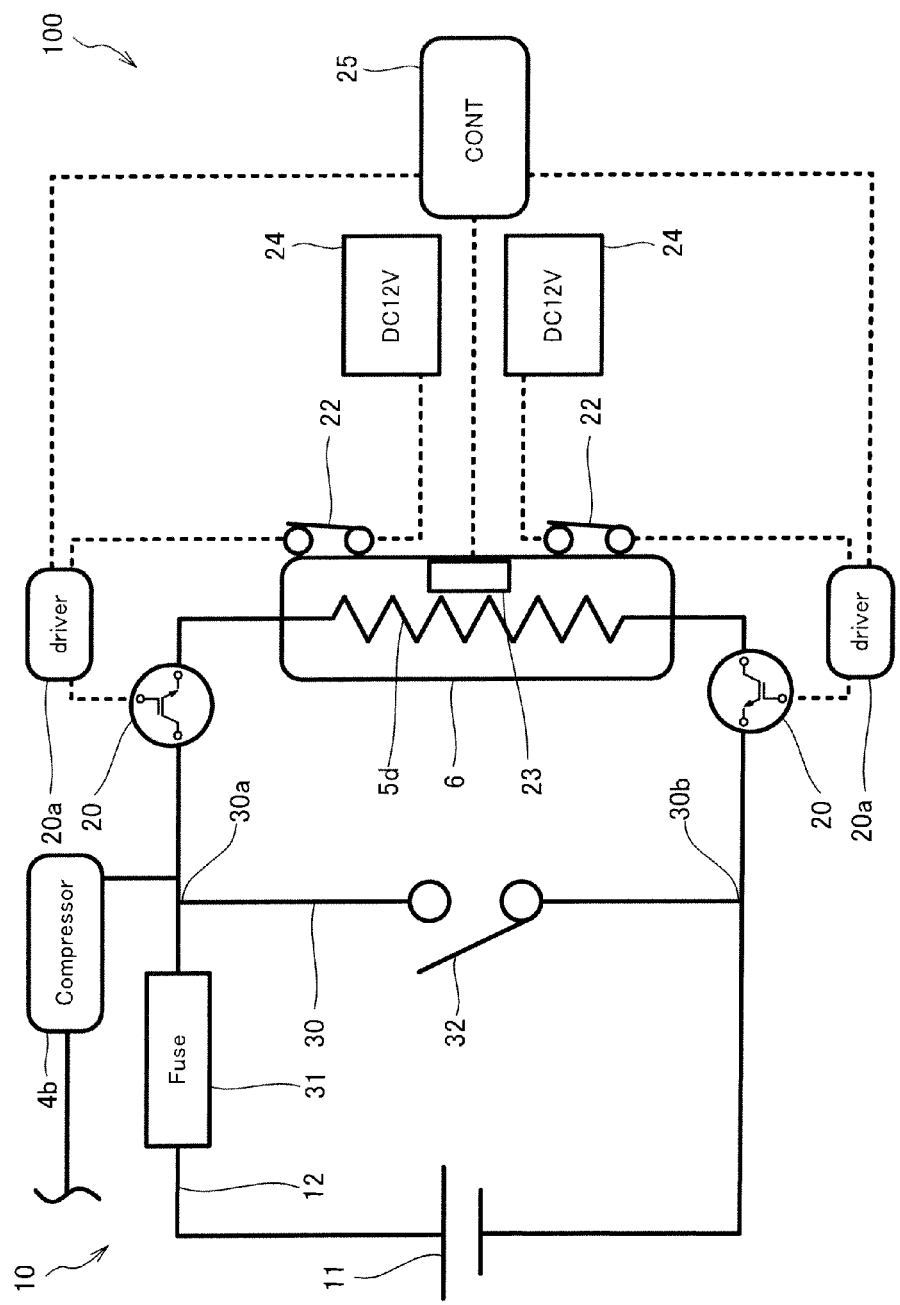
FIG. 2 is a circuit diagram of a vehicle safety device according to a first embodiment of this invention.

As shown in FIG. 2, the electric circuit 10 includes a direct current power supply 11 serving as a power supply, and the electric heater 5d, which serves as a load that is operated by a current supplied from the direct current power supply 11. The electric circuit 10 also includes a water temperature sensor 23 that detects a temperature of the refrigerant in the warm water tank 6, and a controller 25 that controls the current supply to the electric heater 5d on the basis of the refrigerant temperature detected by the water temperature sensor 23.

The direct current power supply 11 is a high current battery installed in a hybrid electric vehicle, an electric vehicle, or the like. An output voltage of the direct current power supply 11 is a high voltage of at least 30V, and is set here at 350V. The current from the direct current power supply 11 is supplied to the electric heater 5d via a supply line 12. An alternating current power supply may be used instead of the direct current power supply 11 as the power supply.

The direct current power supply 11 also supplies a current to the electric compressor 4b, which serves as a different load to the electric heater 5d. In this case, the current supplied to the electric compressor 4b bifurcates from the supply line 12 downstream of a power fuse 31, to be described below.

The electric heater 5d is a sheath heater or a positive temperature coefficient (PTC) heater that generates heat when energized. In terms of cost, the electric heater 5d is preferably a sheath heater. The electric heater 5d is housed in the warm water tank 6 in order to heat the refrigerant used in the heating apparatus of the vehicle.

The water temperature sensor 23 is housed in the warm water tank 6. The water temperature sensor 23 transmits an electric signal corresponding to the detected refrigerant temperature to the controller 25.

When the temperature of the refrigerant is lower than an appropriate temperature range, the controller 25 issues a command to a driver 20a to apply a control current to an IGBT 20, to be described below, so that a current is supplied to the electric heater 5d. When the temperature of the refrigerant is higher than the appropriate temperature range, on the other hand, the controller 25 issues a command to the driver 20a to interrupt the control current to the IGBT 20 so that a current is not supplied to the electric heater 5d. In so doing, the controller 25 adjusts the temperature of the refrigerant to a desired temperature.

The vehicle safety device 100 is capable of interrupting the current supplied to the electric heater 5d from the direct current power supply 11 via the supply line 12 when the temperature of the electric heater 5d itself or the temperature of the refrigerant in the warm water tank 6 rises above an allowable temperature range.

It should be noted that respective "set temperatures" to be described below refer to "the temperature of the electric heater 5d itself or the temperature of the electric heater 5d when the refrigerant in the warm water tank 6 rises above the allowable temperature range", and do not refer to target temperatures during a normal warming operation.

The vehicle safety device 100 includes the insulated gate bipolar transistor (IGBT) 20 as a transistor provided on the supply line 12, a bimetal switch (a first bimetal switch) 22 that switches a control current for controlling the IGBT 20, and a power supply device 24 that supplies the control current (DC 12V) to the IGBT 20.

Further, the vehicle safety device 100 includes a short-circuit line 30 capable of short-circuiting the supply line 12 upstream and downstream of the electric heater 5d, the power fuse 31, which is provided on the supply line 12 between the direct current power supply 11 and the short-circuit line 30, and a bimetal switch (a second bimetal switch) 32 provided on the short-circuit line 30.

The IGBT 20 interrupts the current supplied to the electric heater 5d when the control current is interrupted, and supplies the current to the electric heater 5d when the control current is applied. The IGBT 20 is provided on the supply line 12 closer to the electric heater 5d than a short-circuit position of the short-circuit line 30. When the short-circuit line 30 is short-circuited, the current from the direct current power supply 11 does not flow to the IGBT 20. As a result, the IGBT 20 is protected from a large current generated when the short-circuit line 30 is short-circuited.

The IGBT 20 is provided in a pair upstream and downstream of the electric heater 5d. More specifically, in a flow direction of the current on the supply line 12, one IGBT 20 is provided downstream of a contact with one end 30a of the short-circuit line 30 and upstream of the electric heater 5d, and the other IGBT 20 is provided downstream of the electric heater 5d and upstream of a contact with another end 30b of the short-circuit line 30.

The IGBTs 20 allow the current to flow along the supply line 12 when the control current is applied. When, on the other hand, the controller 25 issues a command to the driver 20a on the basis of the electric signal from the water temperature sensor 23 to interrupt the control current from the power supply device 24, or when the control current is interrupted by the bimetal switch 22, the IGBTs 20 stop functioning so that the current flow along the supply line 12 is interrupted.

The bimetal switch 22 is a normally closed type switch that is normally switched to an energized condition. The bimetal switch 22 is a low current side bimetal switch that passes a smaller current than the bimetal switch 32 when switched to the energized condition. The bimetal switch 22 contacts the electric heater 5d to be capable of heat transfer. The bimetal switch 22 interrupts the control current when the temperature of the electric heater 5d reaches a first set temperature, and applies the control current when the temperature of the electric heater 5d falls to a third set temperature, which is lower than the first set temperature. The bimetal switch 22 is provided in a pair interposed between the power supply device 24 and the respective IGBTs 20.

The first set temperature is set at a higher temperature than an upper limit of the allowable temperature range of the refrigerant in the warm water tank 6. Therefore, when the IGBTs 20 are controlled normally by the controller 25, the bimetal switch 22 is maintained in the energized condition. The third set temperature, meanwhile, is set at a temperature obtained when the temperature of the refrigerant in the warm water tank 6 has decreased sufficiently following interruption of the control current by the bimetal switch 22. For example, the third set temperature is set at a lower limit of the allowable temperature range of the refrigerant in the warm water tank 6.

Figure 3:
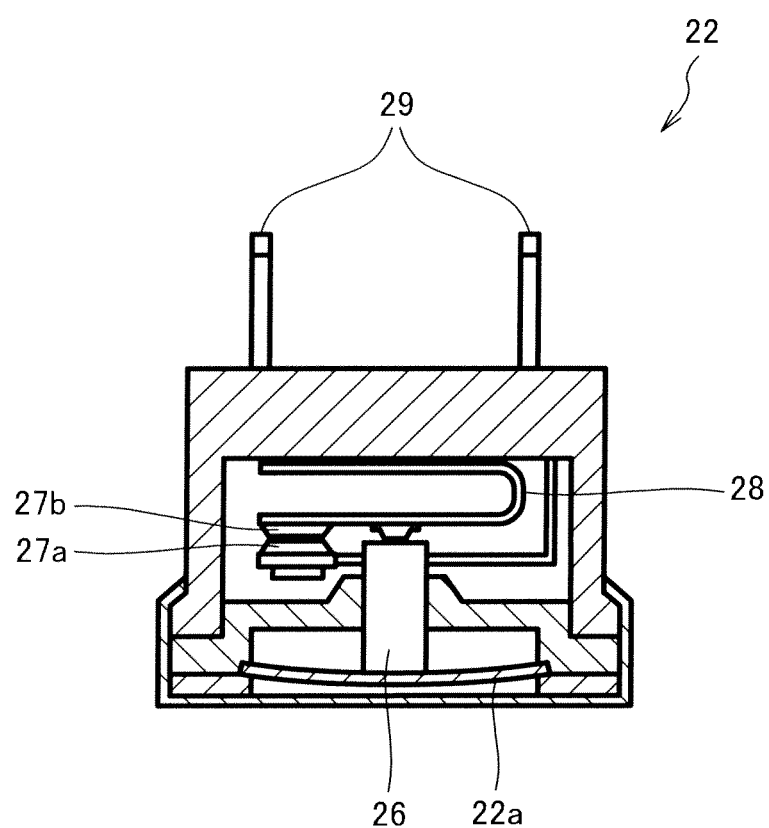
FIG. 3 is a sectional view showing a first bimetal switch in an energized condition.

As shown in FIG. 3, the bimetal switch 22 includes a disc-shaped bimetal 22a that deforms upon reaching a critical temperature, a pin 26 that moves in an axial direction when the bimetal 22a deforms, a fixed contact 27a fixed within a casing, a movable contact 27b biased toward the fixed contact 27a by a biasing force of a spring 28, and a pair of terminals 29 connected respectively to the fixed contact 27a and the movable contact 27b. The bimetal switch 22 is switched between an open condition, in which the current flow is interrupted, and the energized condition, in which the current flow is permitted, in accordance with the deformation of the bimetal 22a.

Heat generated by the electric heater 5d is transmitted to the bimetal 22a either directly or indirectly. The bimetal 22a projects downward (as shown in FIG. 3) when at a lower temperature than the critical temperature, and deforms so as to project upward upon reaching the critical temperature. The critical temperature of the bimetal 22a corresponds to the first set temperature.

When the bimetal 22a reaches the critical temperature, thereby deforming so as to project upward, the movable contact 27b biased by the spring 28 separates from the fixed contact 27a, and as a result, a non-energized condition is established. Accordingly, the bimetal switch 22 is switched to the open condition such that the control current supplied to the IGBT 20 is interrupted.

As shown in FIG. 2, in the flow direction of the current on the supply line 12, one end 30a of the short-circuit line 30 is connected downstream of the power fuse 31 and upstream of the electric heater 5d, while the other end 30b is connected downstream of the electric heater 5d and upstream of the direct current power supply 11. The short-circuit line 30 is a conductor having an extremely small resistance, which connects the one end 30a and the other end 30b connected to the supply line 12. In other words, when the short-circuit line 30 short-circuits the upstream and downstream sides of the electric heater 5d, the resistance of the short-circuit line 30 is smaller than a resistance of the electric heater 5d.

The bimetal switch 32 is a normally open type switch that is normally switched to an open condition. The bimetal switch 32 is a high current side bimetal switch that passes a larger current than the bimetal switch 22 when switched to an energized condition. The bimetal switch 32 contacts the electric heater 5d to be capable of heat transfer. The bimetal switch 32 has a similar specific configuration to the bimetal switch 22, and therefore description thereof will be omitted here.

The bimetal switch 32 is switched to the energized condition when the temperature of the electric heater 5d reaches a second set temperature, which is higher than the first set temperature. When the temperature of the electric heater 5d is lower than the second set temperature, the short-circuit line 30 is not short-circuited. The short-circuit line 30 is short-circuited when the temperature of the electric heater 5d reaches the second set temperature such that the bimetal switch 32 is switched to the energized condition.

The second set temperature is a critical temperature of a bimetal of the bimetal switch 32. The second set temperature is set at a higher temperature than a maximum temperature of the electric heater 5d, which is generated when the temperature of the electric heater 5d increases due to overshoot after reaching the first set temperature such that the bimetal switch 22 interrupts the control current supplied to the IGBT 20 and an interrupted condition is established on the supply line 12. Hence, when the bimetal switch 22 and the IGBT 20 are operating normally, the temperature of the electric heater 5d does not reach the second set temperature.

The power fuse 31 is disconnected by a large current (an overcurrent) that flows momentarily when the short-circuit line 30 is short-circuited. The resistance of the short-circuit line 30 is extremely small, and therefore, when the short-circuit line 30 is short-circuited, a large current (an overcurrent) that is larger than the current flowing to the electric heater 5d prior to short-circuiting of the short-circuit line 30 flows to the power fuse 31. The power fuse 31 is disconnected by the current supplied from the direct current power supply 11 before heat generated by a harness (not shown) for supplying the current exceeds an allowable temperature. The allowable temperature is set at a temperature at which constituent components of the harness are not damaged.

The power fuse 31 is shared by the electric heater 5d and the electric compressor 4b, both of which are supplied with a current from the direct current power supply 11. Therefore, when the power fuse 31 is disconnected, current supply is stopped not only to the electric heater 5d but also to the electric compressor 4b.

Next, referring to FIGS. 4 to 6, an arrangement of the bimetal switch 22 and the bimetal switch 32 will be described.

Figure 4:
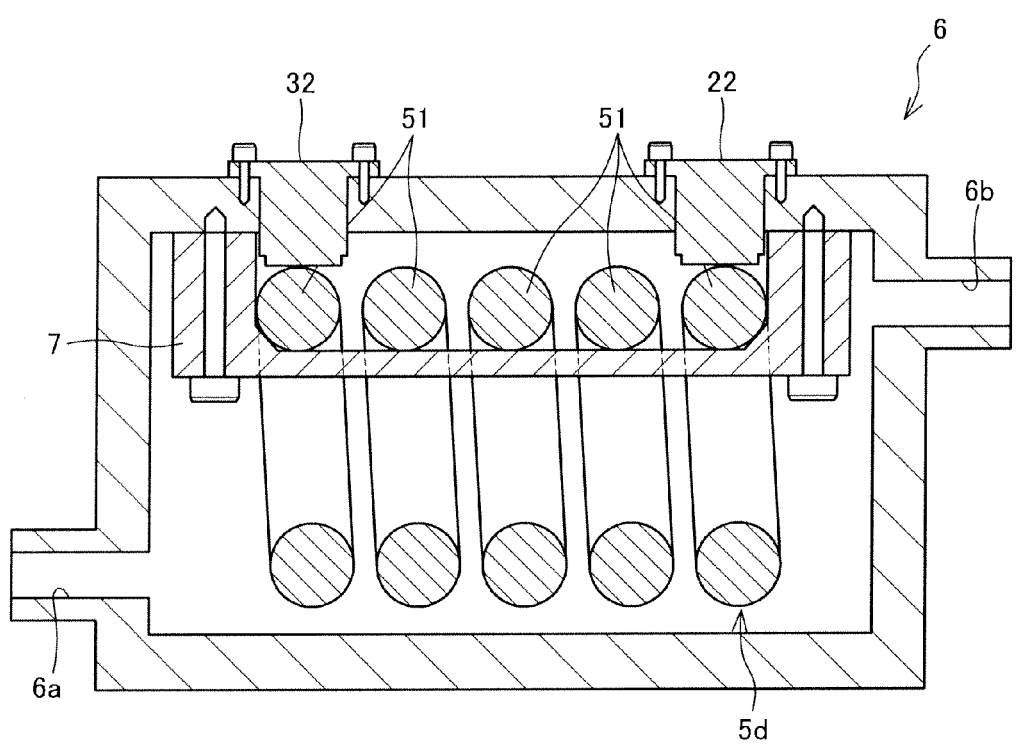
FIG. 4 is a sectional view showing a warm water tank of the vehicle air-conditioning device.

As shown in FIG. 4, the warm water tank 6 includes a supply passage 6a through which the refrigerant is supplied, an exhaust passage 6b through which the refrigerant heated by the electric heater 5d is discharged, and a holding member 7 that holds the electric heater 5d in its interior. The refrigerant flowing through the warm water tank 6 is cooling water such as antifreeze, for example. The bimetal switch 22 and the bimetal switch 32 are attached to the warm water tank 6.

Figure 5:
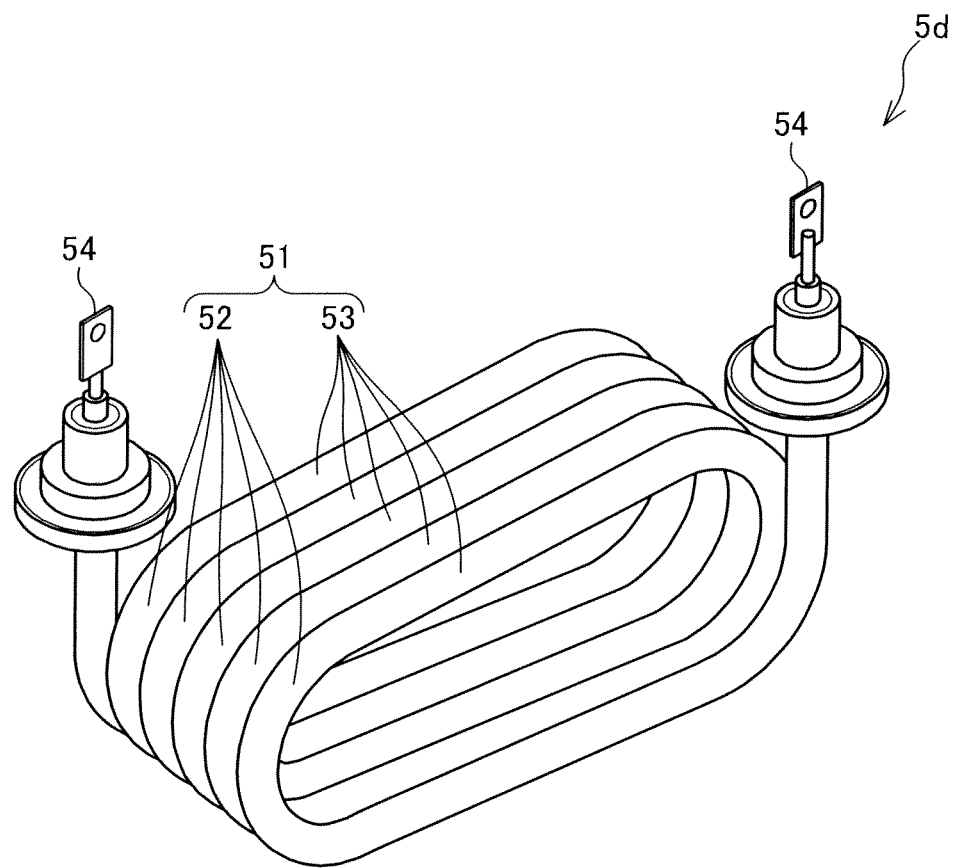
FIG. 5 is a perspective view of an electric heater.
Figure 6:
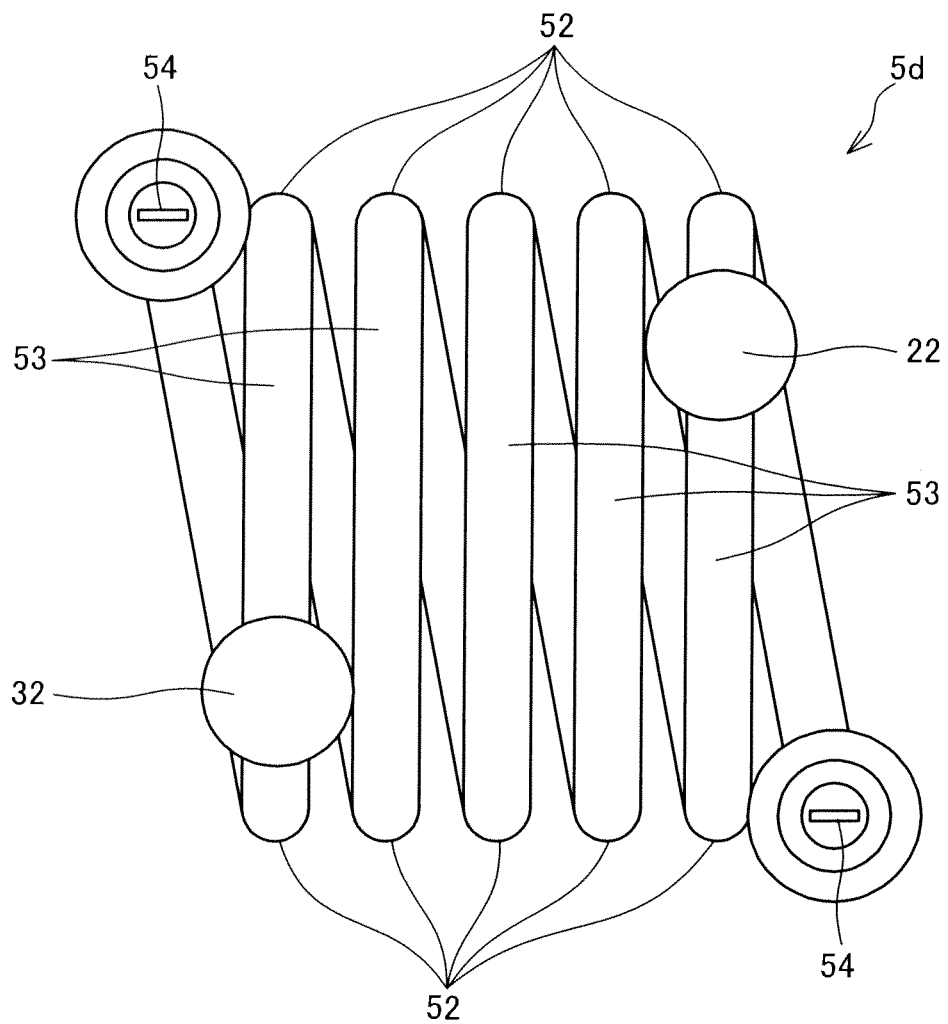
FIG. 6 is a plan view illustrating an arrangement of the first bimetal switch and a second bimetal switch relative to the electric heater.

As shown in FIG. 5, the electric heater 5d includes a plurality of parallel heat generation portions 51, and terminal portions 54 formed at either end, to which power is supplied. The electric heater 5d is formed in a spiral shape wound such that the heat generation portions 51 are adjacent to each other in sequence. The electric heater 5d does not necessarily have to take a spiral shape as long as the heat generation portions 51 are adjacent to each other.

The heat generation portion 51 is formed to have an annular cross-section. Here, the cross-section of the heat generation portion 51 is circular. The heat generation portion 51 includes a rectilinear portion 53 formed in a straight line, and a curved portion 52 linking an end portion of the rectilinear portion 53 to an adjacent rectilinear portion 53.

As shown in FIG. 4, the bimetal switch 22 and the bimetal switch 32 are attached to an upper portion of the warm water tank 6 so as to sandwich the heat generation portions 51 of the electric heater 5d together with the holding member 7. The bimetal switch 22 and the bimetal switch 32 are inserted into the interior of the warm water tank 6 from the outside, and fastened to the outside of the warm water tank 6 by bolts. The bimetal switch 22 and the bimetal switch 32 are pressed against the electric heater 5d by a fastening force of the bolts.

The bimetal switch 22 is attached in a position closer to the exhaust passage 6b than the bimetal switch 32. The bimetal switch 32, on the other hand, is attached in a position closer to the supply passage 6a than the bimetal switch 22.

When the refrigerant supplied to the warm water tank 6 is in the vicinity of the supply passage 6a, the refrigerant has not yet been warmed by the electric heater 5d and is therefore comparatively low in temperature. In the vicinity of the exhaust passage 6b, the refrigerant has been warmed by the electric heater 5d and is therefore comparatively high in temperature. The temperature of the electric heater 5d itself is likewise higher in the vicinity of the exhaust passage 6b than in the vicinity of the supply passage 6a. Thus, heat from a first part of the electric heater 5d having a comparatively high temperature is transmitted to the bimetal switch 22, while heat from a second part of the electric heater 5d having a lower temperature than the first part is transmitted to the bimetal switch 32.

Hence, the low current side bimetal switch 22 is switched before the high current side bimetal switch 32. Accordingly, the bimetal switch 22 can be switched to an interrupted condition such that the control current supplied to the IGBT 20 is interrupted before the bimetal switch 32 is switched to the energized condition such that the power fuse 31 is disconnected. As a result, a safety circuit that enables the supply line 12 to be returned to the energized condition can be operated before a safety circuit that makes returning to the energized condition impossible.

It should be noted that an amount of heat captured by the refrigerant from the electric heater 5d decreases as a flow speed of the refrigerant through the warm water tank 6 decreases, and as a result, the temperature of the electric heater 5d itself becomes more likely to increase. On the other hand, the amount of heat captured by the refrigerant from the electric heater 5d increases as the flow speed of the refrigerant through the warm water tank 6 increases, and as a result, the temperature of the electric heater 5d itself becomes more likely to decrease. Hence, when bringing the bimetal switches 22, 32 into contact with the electric heater 5d, the bimetal switch 22 may be disposed in a part of the warm water tank 6 where the flow speed of the refrigerant is low, and the bimetal switch 32 may be disposed in a part where the refrigerant flow speed is relatively high in comparison with the part where the bimetal switch 22 is disposed. By disposing the bimetal switches 22, 32 in this manner, a similar effect to that described above is obtained.

Incidentally, in this embodiment, the refrigerant flow speed is lower in the vicinity of the exhaust passage 6b than in the vicinity of the supply passage 6a. Therefore, the bimetal switch 22 is disposed in the part of the warm water tank 6 where the refrigerant flow speed is low, while the bimetal switch 32 is disposed in the part where the refrigerant flow speed is high in comparison with the part where the bimetal switch 22 is disposed.

Next, referring mainly to FIG. 2, an operation of the vehicle safety device 100 will be described.

In a normal condition where the temperature of the refrigerant in the warm water tank 6 is within the allowable temperature range, the bimetal switch 32 is maintained in the open condition such that the current flow to the short-circuit line 30 is interrupted. Further, the bimetal switch 22 is maintained in the energized condition such that the control current is applied to the IGBT 20. As a result, the current from the direct current power supply 11 is supplied to the electric heater 5d such that the electric heater 5d generates heat by which the refrigerant flowing through the warm water tank 6 is heated.

When, in this condition, the temperature of the electric heater 5d itself or the temperature of the refrigerant in the warm water tank 6 rises beyond the allowable temperature range, the vehicle safety device 100 is activated. In the vehicle safety device 100, first to third safety circuits to be described below are activated in three stages to interrupt the current supplied to the electric heater 5d from the direct current power supply 11.

First, when the temperature of the refrigerant in the warm water tank 6 rises beyond the allowable temperature range, an electric signal corresponding to the temperature of the refrigerant is transmitted from the water temperature sensor 23 to the controller 25. On the basis of the electric signal, the controller 25 issues a command to the driver 20a not to apply the control current to the IGBT 20. As a result, the current flow along the supply line 12 is interrupted. This operation corresponds to the first safety circuit.

Here, when a flow rate of the refrigerant in the warm water tank 6 decreases due to an abnormality, for example, the electric heater 5d enters a so-called empty heating condition. In this condition, the temperature of the electric heater 5d itself may rise above the allowable temperature range before the refrigerant temperature detected by the water temperature sensor 23 increases.

When the temperature of the electric heater 5d increases so as to reach the first set temperature, the bimetal switch 22 is switched from the energized condition to the open condition. Accordingly, the control current supplied to the IGBT 20 is interrupted regardless of the control performed by the controller 25, and as a result, the current flow along the supply line 12 is interrupted. This operation corresponds to a second safety circuit.

When the temperature of the electric heater 5d falls thereafter so as to reach the third set temperature, the bimetal switch 22 is switched from the open condition to the energized condition. As a result, the control current is applied to the IGBT 20 such that the supply line 12 is returned to the energized condition.

Therefore, when the temperature of the electric heater 5d reaches the first set temperature, the bimetal switch 22 interrupts the control current applied to the IGBT 20 such that the supply line 12, along which a current is supplied from the direct current power supply 11 to the electric heater 5d, enters an interrupted condition. Then, when the temperature of the electric heater 5d falls to the third set temperature, which is lower than the first set temperature, the bimetal switch 22 applies the control current to the IGBT 20 such that the supply line 12 is returned to the energized condition from the interrupted condition. Hence, in a case where the flow rate of the refrigerant through the warm water tank 6 decreases temporarily and then returns to normal, for example, the electric heater 5d can be used again to heat the refrigerant.

It should be noted that in the vehicle safety device 100, two each of the IGBT 20 and the bimetal switch 22 are provided. Therefore, in the second safety circuit, even when one bimetal switch 22 cannot be switched to the open condition due to an abnormality, the other bimetal switch 22 can be switched to the open condition to compensate. In other words, the second safety circuit is a twofold safety circuit.

At this time, the critical temperatures of the respective bimetal switches 22 may be dissimilated by employing as one of the bimetal switches 22 a switch that is switched to the open condition at a higher temperature than the temperature at which the other bimetal switch 22 is switched to the open condition, for example.

As described above, the bimetal switches 22 are normally closed type switches, but instead, normally open type bimetal switches that apply the control current when the temperature of the electric heater 5d reaches the first set temperature and interrupt the control current when the temperature of the electric heater 5d falls to the third set temperature may be used. In this case, IGBTs that interrupt the current supplied to the electric heater 5d when the control current is applied and supply the current to the electric heater 5d when the control current is interrupted are used instead of the IGBTs 20.

Furthermore, when the temperature of the electric heater 5d increases beyond the first set temperature due to an abnormality such that neither of the two bimetal switches 22 can be switched to the open condition, or when the bimetal switches 22 are switched to the open condition but the IGBTs 20 do not interrupt the current on the supply line 12, the bimetal switch 32 provided on the short-circuit line 30 is activated.

More specifically, when the temperature of the electric heater 5d reaches the second set temperature, the bimetal is deformed by the temperature of the electric heater 5d such that the bimetal switch 32 is switched to the energized condition. Accordingly, the short-circuit line 30 is short-circuited such that a large current generated by the short-circuit flows to the power fuse 31 provided on the supply line 12. In other words, when the temperature of the electric heater 5d reaches the second set temperature, an overcurrent is caused to flow to the power fuse 31 intentionally. As a result, the power fuse 31 is disconnected, whereby the current on the supply line 12 is interrupted. This operation corresponds to the third safety circuit.

Hence, when the temperature of the electric heater 5d rises further from the first set temperature so as to reach the second set temperature, the bimetal switch 32 short-circuits the short-circuit line 30, thereby causing an overcurrent to flow such that the power fuse 31 is disconnected, and as a result, the current flowing along the supply line 12 is interrupted in such a manner that the supply line 12 cannot be returned to the energized condition.

By disconnecting the power fuse 31, therefore, the current from the direct current power supply 11 can be interrupted reliably even when an abnormality occurs in the IGBT 20, even if, such that the current from the direct current power supply 11 cannot be interrupted. As a result, the reliability with which the current supplied to the electric heater 5d from the direct current power supply 11 is interrupted can be improved.

Further, the current flowing along the supply line 12 from the direct current power supply 11 bifurcates downstream of the power fuse 31 and upstream of the IGBT 20 such that a current is also supplied to the electric compressor 4b. In this case, the power fuse 31 is not disconnected when the electric heater 5d and the electric compressor 4b are operating normally. The power fuse 31 is disconnected when the short-circuit line 30 is short-circuited by the bimetal switch 32 or an overcurrent flows through the entire circuit due to an abnormality such as a short-circuit in the electric compressor 4b.

By sharing the power fuse 31 among a plurality of loads in this manner, costs can be suppressed in comparison with a case where a power fuse is provided for each load. It should be noted that a power fuse provided in a fuse box of the vehicle may be used as the power fuse 31.

Furthermore, in this embodiment, power interruption by the bimetal switch 22 and the IGBT 20 occurs before power interruption by the bimetal switch 32 and the power fuse 31. Hence, at the point where power interruption by the bimetal switch 22 and the IGBT 20 occurs, power is still being supplied to the electric compressor 4b, and therefore functions of the cooler unit 4 can be maintained. For example, dehumidification and warming can be performed using preheat from the power-interrupted electric heater 5d while operating the cooler unit 4. Alternatively, cooling can be performed using the cooler unit 4.

The bimetal switch 22 and the bimetal switch 32 are switched to the energized condition mechanically on the basis of the temperature of the electric heater 5d. Hence, a control device for short-circuiting the short-circuit line 30 is not required, and therefore costs can be suppressed. Moreover, in comparison with a case in which a control device is used, operational reliability is improved.

According to the first embodiment described above, following effects are obtained.

When the temperature of the electric heater 5d reaches the first set temperature, the bimetal switch 22 interrupts the control current applied to the IGBT 20, thereby establishing an interrupted condition in the supply line 12 along which a current is supplied from the direct current power supply 11 to the electric heater 5d. When the temperature of the electric heater 5d then falls to the third set temperature, which is lower than the first set temperature, the bimetal switch 22 applies the control current to the IGBT 20 such that the supply line 12 is returned to the energized condition from the interrupted condition. Hence, in a case where the flow rate of the refrigerant through the warm water tank 6 decreases temporarily and then returns to normal, for example, warming can be resumed using the electric heater 5d.

Moreover, when the temperature of the electric heater 5d rises further so as to reach the second set temperature, which is higher than the first set temperature, the bimetal switch 32 short-circuits the short-circuit line 30, thereby causing an overcurrent to flow such that the power fuse 31 is disconnected, and as a result, the current flowing along the supply line 12 is interrupted in such a manner that the supply line 12 cannot be returned to the energized condition.

By disconnecting the power fuse 31 in this manner, the current from the direct current power supply 11 can be interrupted reliably even when an abnormality occurs in the IGBT 20, even if, such that the current from the direct current power supply 11 cannot be interrupted. As a result, the reliability with which the current supplied to the electric heater 5d from the direct current power supply 11 is interrupted can be improved.

Figure 7:
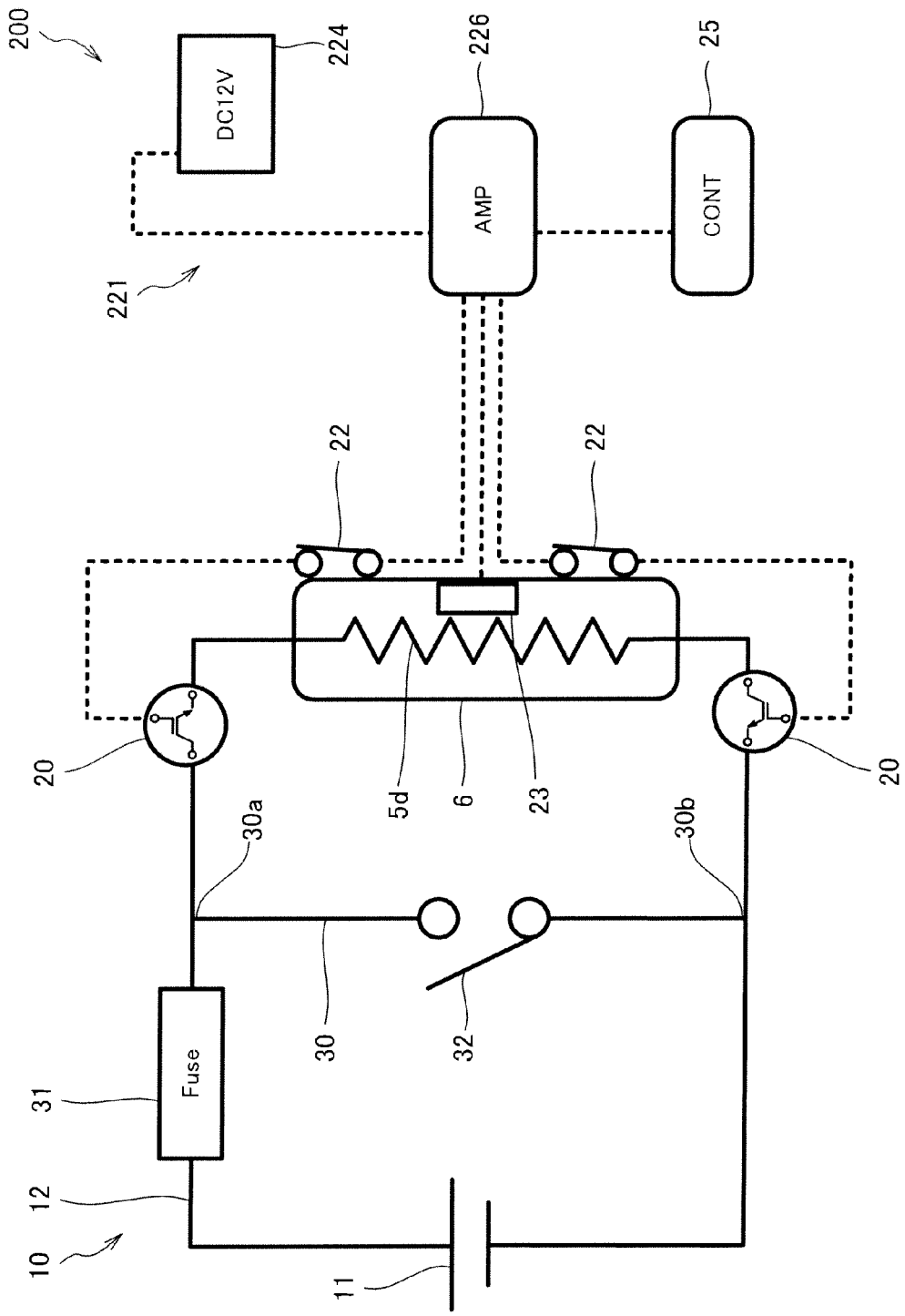
FIG. 7 is a circuit diagram of a vehicle safety device according to a second embodiment of this invention.

Referring to FIG. 7, a vehicle safety device 20 according to a second embodiment of this invention will be described below. It should be noted that in each of the following embodiments, similar configurations to those of the first embodiment have been allocated identical reference symbols, and where appropriate, duplicate description thereof has been omitted.

The second embodiment differs from the first embodiment in that a power supply device 221 capable of controlling the control current applied to the IGBT 20 is provided in place of the driver 20a that adjusts the control current applied to the IGBT 20.

The power supply device 221 includes a direct current power supply 224 that supplies the control current (DC 12V) to the IGBT 20, the controller 25 that controls the flow of the control current, and an amplifier 226 that adjusts the control current on the basis of a command from the controller 25.

In the vehicle safety device 200, when the temperature of the refrigerant in the warm water tank 6 increases beyond the allowable temperature range, an electric signal corresponding to the temperature of the refrigerant is transmitted from the water temperature sensor 23 to the controller 25 via the amplifier 226. On the basis of the electric signal, the controller 25 issues a command via the amplifier 226 not to apply the control current to the IGBT 20. As a result, the current flow along the supply line 12 is interrupted.

Further, when the temperature of the electric heater 5d rises to the first set temperature, the bimetal switch 22 is switched from the energized condition to the open condition. Accordingly, the control current applied to the IGBT 20 is interrupted regardless of the control performed by the controller 25 via the amplifier 226, and as a result, the current flow along the supply line 12 is interrupted.

In the second embodiment described above, similarly to the first embodiment, when the temperature of the electric heater 5d reaches the first set temperature, the IGBT 20 and the bimetal switch 22 set the supply line 12 along which the current supplied to the electric heater 5d from the direct current power supply 11 flows in the interrupted condition. When the temperature of the electric heater 5d then falls to the third set temperature, which is lower than the first set temperature, the IGBT 20 and the bimetal switch 22 return the supply line 12 to the energized condition from the interrupted condition.

Moreover, when the temperature of the electric heater 5d rises further so as to reach the second set temperature, which is higher than the first set temperature, the bimetal switch 32 is switched to the energized condition such that the power fuse 31 is disconnected, and as a result, the current flowing along the supply line 12 is interrupted such that the supply line 12 cannot be returned to the energized condition. Therefore, the reliability of current interruption when an abnormality occurs in the electric heater 5d can be improved.

Figure 8:
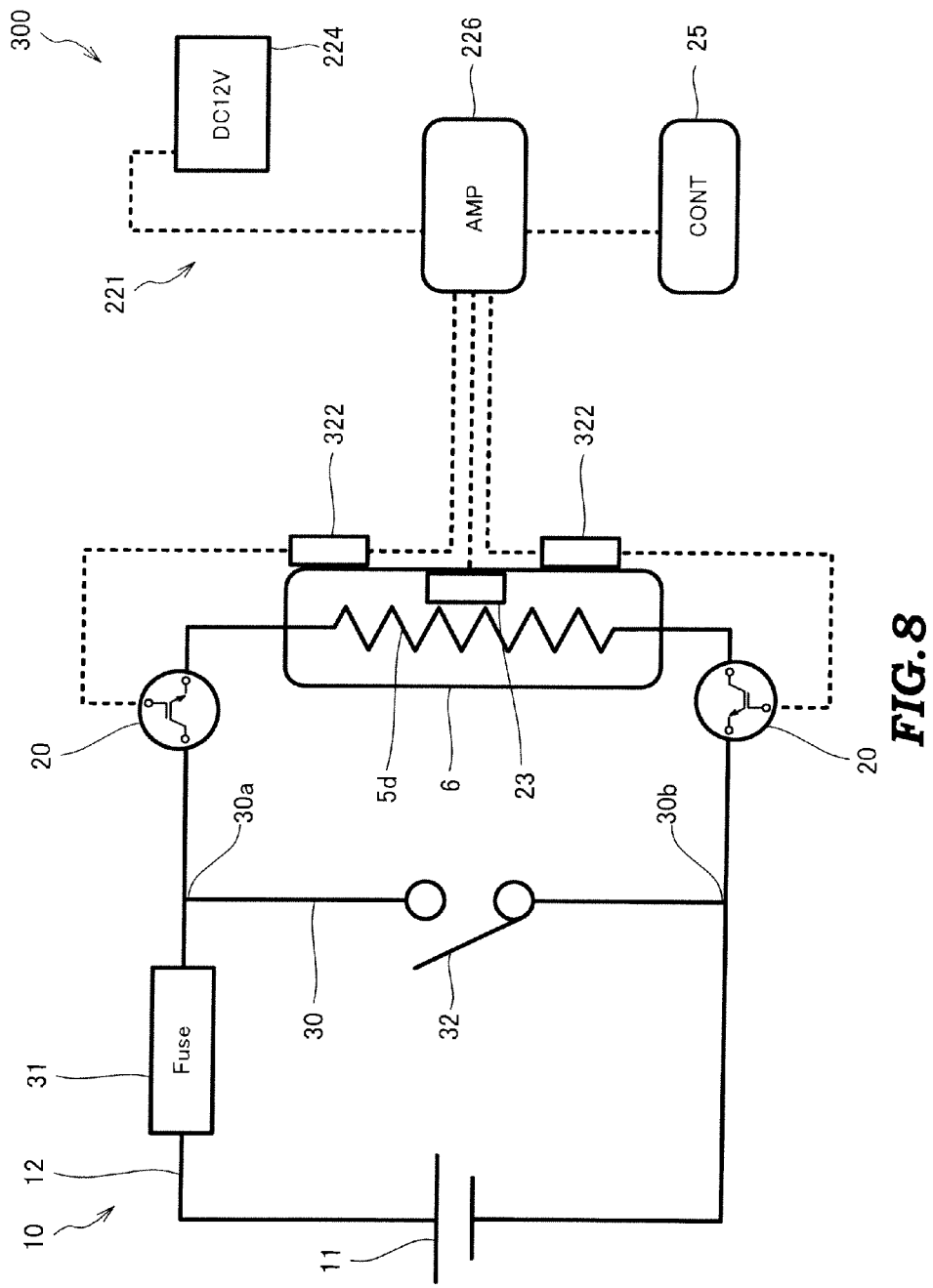
FIG. 8 is a circuit diagram of a vehicle safety device according to a third embodiment of this invention.

Referring to FIG. 8, a vehicle safety device 300 according to a third embodiment of this invention will be described below. Similarly to the first embodiment, although not shown in FIG. 8, the direct current power supply 11 also supplies a current to the electric compressor 4b serving as a different load to the electric heater 5d. In this case, the current supplied to the electric compressor 4b bifurcates from the supply line 12 between the power fuse 31 and the IGBT 20.

The third embodiment differs from the respective embodiments described above in that a temperature fuse 322 is used in place of the bimetal switch 22 to interrupt the control current applied to the IGBT 20.

The vehicle safety device 300 includes the temperature fuse 322, which is disconnected when the temperature of the electric heater 5d increases.

The temperature fuse 322 is provided in a pair interposed between the amplifier 226 of the power supply device 221 and the respective IGBTs 20. The temperature fuse 322 is switched when the temperature of the electric heater 5d rises to the first set temperature.

In the vehicle safety device 300, when the temperature of the refrigerant in the warm water tank 6 increases beyond the allowable temperature range, an electric signal corresponding to the temperature of the refrigerant is transmitted from the water temperature sensor 23 to the controller 25 via the amplifier 226. On the basis of the electric signal, the controller 25 issues a command via the amplifier 226 not to apply the control current to the IGBT 20. As a result, the current flow along the supply line 12 is interrupted.

Further, when the temperature of the electric heater 5d rises to the first set temperature, the temperature fuse 322 is disconnected by the temperature of the electric heater 5d. Accordingly, the control current applied to the IGBT 20 is interrupted regardless of the control performed by the controller 25, and as a result, the current flowing along the supply line 12 is interrupted such that the supply line 12 cannot be returned to the energized condition.

Furthermore, when an abnormality occurs such that the temperature of the electric heater 5d increases beyond the first set temperature but neither of the two temperature fuses 322 can be disconnected, the bimetal switch 32 provided on the short-circuit line 30 is activated.

More specifically, when the temperature of the electric heater 5d reaches the second set temperature, the bimetal is deformed by the temperature of the electric heater 5d such that the bimetal switch 32 is switched to the energized condition. Accordingly, the short-circuit line 30 is short-circuited such that a large current generated by the short-circuit flows to the power fuse 31 provided on the supply line 12. In other words, when the temperature of the electric heater 5d reaches the second set temperature, an overcurrent is caused to flow to the power fuse 31 intentionally. As a result, the power fuse 31 is disconnected, whereby the current on the supply line 12 is interrupted.

Hence, when the temperature of the electric heater 5d rises further from the first set temperature so as to reach the second set temperature, the bimetal switch 32 short-circuits the short-circuit line 30, thereby causing an overcurrent to flow such that the power fuse 31 is disconnected, and as a result, the current flowing along the supply line 12 is interrupted such that the supply line 12 cannot be returned to the energized condition.

By disconnecting the power fuse 31, therefore, the current from the direct current power supply 11 can be interrupted reliably even when an abnormality occurs in the IGBT 20, even if, such that the current from the direct current power supply 11 cannot be interrupted. As a result, the reliability with which the current supplied to the electric heater 5d from the direct current power supply 11 is interrupted can be improved.

In the third embodiment described above, when the temperature of the electric heater 5d reaches the first set temperature, the temperature fuse 322 is disconnected, whereby the IGBT 20 cuts off the supply line 12 along which the current supplied to the electric heater 5d from the direct current power supply 11 flows such that the supply line 12 cannot be returned to the energized condition.

When the temperature of the electric heater 5d rises further so as to reach the second set temperature, which is higher than the first set temperature, the bimetal switch 32 is switched to the energized condition such that the power fuse 31 is disconnected, and as a result, the current flowing along the supply line 12 is interrupted such that the supply line 12 cannot be returned to the energized condition. Thus, the reliability of current interruption when an abnormality occurs in the electric heater 5d can be improved.

Embodiments of this invention were described above, but the above embodiments are merely examples of applications of this invention, and the technical scope of this invention is not limited to the specific constitutions of the above embodiments.

For example, in the above embodiments, the temperature of the electric heater 5d is detected as the load, but instead, the temperature of another device such as an electric motor may be detected. Likewise in this case, the vehicle safety devices 100, 200, and 300 can interrupt the current from the direct current power supply 11 reliably when an abnormality occurs.

This application claims priority based on Japanese Patent Application No.2012-100929 filed with the Japan Patent Office on Apr. 26, 2012, and Japanese Patent Application No. 2012-281693 filed with the Japan Patent Office on Dec. 25, 2012, the entire contents of which are incorporated into this specification.

The embodiments of this invention in which an exclusive property or privilege is claimed are defined as follows.

What is claimed is:

1. A water-heating device installed in a hybrid electric vehicle or an electric vehicle, the water-heating device being configured to heat water as a refrigerant, the water-heating device comprising:

a warm water tank including a supply passage and an exhaust passage, the refrigerant being supplied through the supply passage and discharged through the exhaust passage;

an electric heater housed in the warm water tank;

a supply line configured to supply a current to the electric heater from a power supply;

an interrupting system including a heat detector, the heat detector being configured to detect heat from the electric heater, the interrupting system being configured to set the supply line in an interrupted condition when a temperature of the electric heater reaches a set temperature; and a holding member holding the electric heater in the warm water tank, wherein the heat detector is configured to transfer heat from the electric heater at a position in the warm water tank, the position being closer to the supply passage than the exhaust passage, and the electric heater is sandwiched between the holding member and the heat detector.

2. The water-heating device as defined in claim 1, wherein the interrupting system is incapable of returning the supply line to an energized condition from the interrupted condition.

3. The water-heating device as defined in claim 1, wherein the heat detector is a bimetal switch.

4. A water-heating device installed in a hybrid electric vehicle or an electric vehicle, the water-heating device being configured to heat water as a refrigerant, the water-heating device comprising:

a warm water tank including a supply passage and an exhaust passage, the refrigerant being supplied through the supply passage and discharged through the exhaust passage;

an electric heater housed in the warm water tank;

a supply line configured to supply a current to the electric heater from a power supply; and an interrupting system including a heat detector, the heat detector being configured to detect heat from the electric heater, the interrupting system being configured to set the supply line in an interrupted condition when a temperature of the electric heater reaches a set temperature, wherein the heat detector is configured to transfer heat from the electric heater at a position in the warm water tank, the position being closer to the supply passage than the exhaust passage, wherein the heat detector is a bimetal switch, wherein the interrupting system includes;

a short-circuit line being provided with the bimetal switch and capable of short-circuiting an upstream side and a downstream side of the supply line where the electric heater is installed; and a power fuse provided on the supply line, wherein the bimetal switch is configured to be switched to a conducting condition to short-circuit the short-circuit line when the temperature of the electric heater reaches the set temperature.

5. The water-heating device as defined in claim 4, wherein the power supply configured to supply a current to another load different to the electric heater, and the power fuse is shared by the electric heater and the other load.

6. The water-heating device as defined in claim 5, wherein the other load is an electric compressor.

* * * * *